US011184507B2

United States Patent
Sneyders et al.

(10) Patent No.: US 11,184,507 B2
(45) Date of Patent: Nov. 23, 2021

(54) ADAPTIVE COLOR TRANSFORMATION TO AID COMPUTER VISION

(71) Applicant: Raven Industries, Inc., Sioux Falls, SD (US)

(72) Inventors: Yuri Sneyders, Zemst (BE); John D. Preheim, Beresford, SD (US); Jeffrey Allen Van Roekel, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 40 days.

(21) Appl. No.: 16/509,158

(22) Filed: Jul. 11, 2019

(65) Prior Publication Data

US 2020/0021716 A1     Jan. 16, 2020

Related U.S. Application Data

(60) Provisional application No. 62/696,727, filed on Jul. 11, 2018.

(51) Int. Cl.
*H04N 1/60*     (2006.01)
*G06T 5/00*     (2006.01)

(52) U.S. Cl.
CPC ........... *H04N 1/6008* (2013.01); *G06T 5/009* (2013.01); *H04N 1/6016* (2013.01); *G06T 2207/10024* (2013.01); *G06T 2207/20208* (2013.01); *G06T 2207/30188* (2013.01)

(58) Field of Classification Search
CPC . G06T 2207/10024; G06T 2207/20208; G06T 2207/30188; G06T 5/009; H04N 1/6008; H04N 1/6016; H04N 1/6063
See application file for complete search history.

(56) References Cited

U.S. PATENT DOCUMENTS

| 8,659,795 | B2 | 2/2014 | Nakamura |
| 2012/0287143 | A1 | 11/2012 | Brown Elliott |
| 2016/0188181 | A1 | 6/2016 | Smith |
| 2016/0253792 | A1* | 9/2016 | Xu ........................... H04N 9/67 345/590 |
| 2019/0260909 | A1* | 8/2019 | Shibuya ............... H04N 1/6036 |

(Continued)

FOREIGN PATENT DOCUMENTS

| WO | WO-2017/175231 A1 | 10/2017 |
| WO | WO-2020/014531 A1 | 1/2020 |

OTHER PUBLICATIONS

"International Application Serial No. PCT/US2019/041475, International Search Report dated Oct. 8, 2019", 2 pgs.

(Continued)

*Primary Examiner* — Vikkram Bali
(74) *Attorney, Agent, or Firm* — Schwegman Lundberg & Woessner, P.A.

(57) ABSTRACT

System and techniques for adaptive color transformation to aid computer vision are described herein. Colors from an image are mapped into a multi-dimensional space to create a distribution of colors in the image. A line can be fit to the distribution. Here, the line includes an angle relative to a coordinate system of the multi-dimensional space. A transformation to colors can then be applied to the image based on the angle of the line. The transformation producing a reduced image where a color complexity of the original image is reduced.

20 Claims, 7 Drawing Sheets

(56) References Cited

U.S. PATENT DOCUMENTS

| | | | |
|---|---|---|---|
| 2020/0043149 A1* | 2/2020 | Partin | G09G 5/02 |
| 2020/0074630 A1* | 3/2020 | Garcia | G06T 7/0012 |
| 2020/0184733 A1* | 6/2020 | Walton | G06T 7/30 |

OTHER PUBLICATIONS

"International Application Serial No. PCT/US2019/041475, Written Opinion dated Oct. 8, 2019", 4 pgs.
"European Application Serial No. 19833128.2, Response filed Sep. 2, 2021 to Communication Pursuant to Article 94(3) EPC dated Feb. 23, 2021", 9 pgs.

* cited by examiner

ADAPTIVE COLOR TRANSFORMATION TO AID COMPUTER VISION

TECHNICAL FIELD

Embodiments described herein generally relate to computer vision systems for vehicles and more specifically to adaptive color transformation in an image to aid computer vision.

BACKGROUND

Many crops that are farmed are row crops. Row crops are arranged into rows that are generally equally spaced parallel rows in a field separated by furrows. Tending row crops generally involves passing agricultural equipment (AEQ) (e.g., tractors, planters, harvesters, irrigators, fertilizers, etc.) over the field. Generally, the AEQ should follow the rows such that support structures (e.g., wheels, treads, skids, etc.) remain in the furrows so as not to damage the crops. Further, equipment dealing directly with the crops should follow the centerline of the crop rows.

Navigation systems using an external location mechanism have been employed to facilitate automatic navigation of AEQ. These systems include using global position system (GPS) units to locate the position of AEQ with respect to crop rows. Generally, these systems use an initialization operation to determine positions through which the AEQ should pass and then provide information about the current position of AEQ in a field to facilitate navigation. An example initialization operation can include using a GPS unit to record the movement of AEQ as the row crops are planted. This recording can later be used to guide the AEQ for subsequent operations.

Computer vision (CV) can be used to guide AEQ down the crop rows. CV can be superior to external location mechanisms when for example, the external location mechanism is compromised (e.g., has inaccurate or absent positioning) or has not been initialized. A CV navigation system generally involves a sensor, such as a camera, mounted on the AEQ to collect features of the environment. These features can be used to ascertain AEQ position relative to a crop related row (e.g., a crop row or a furrow) positions and provide that information as parameters to a steering controller to control the AEQ.

Often, CV steering systems ascertain two guidance parameters that are provided to the steering controller: track-angle error (TKE) and cross-track distance (XTK). TKE involves the angle between the forward direction of the AEQ and the rows such that, when the AEQ is following the rows the TKE is 0° and when the AEQ is moving parallel to the rows the TKE is 90°. Accordingly, the TKE can be considered the current angle-of-attack for AEQ moving towards a given row. The XTK distance is the distance between the current position of the AEQ and the crop related row. Using TKE and XTK as parameters to the steering module can allow for an effective row guidance system of AEQ using CV. Thus, costs and error can be reduced in performing an initialization operation for GPS based systems, or for automatic navigation of AEQ when GPS, or other navigation systems, are unavailable.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
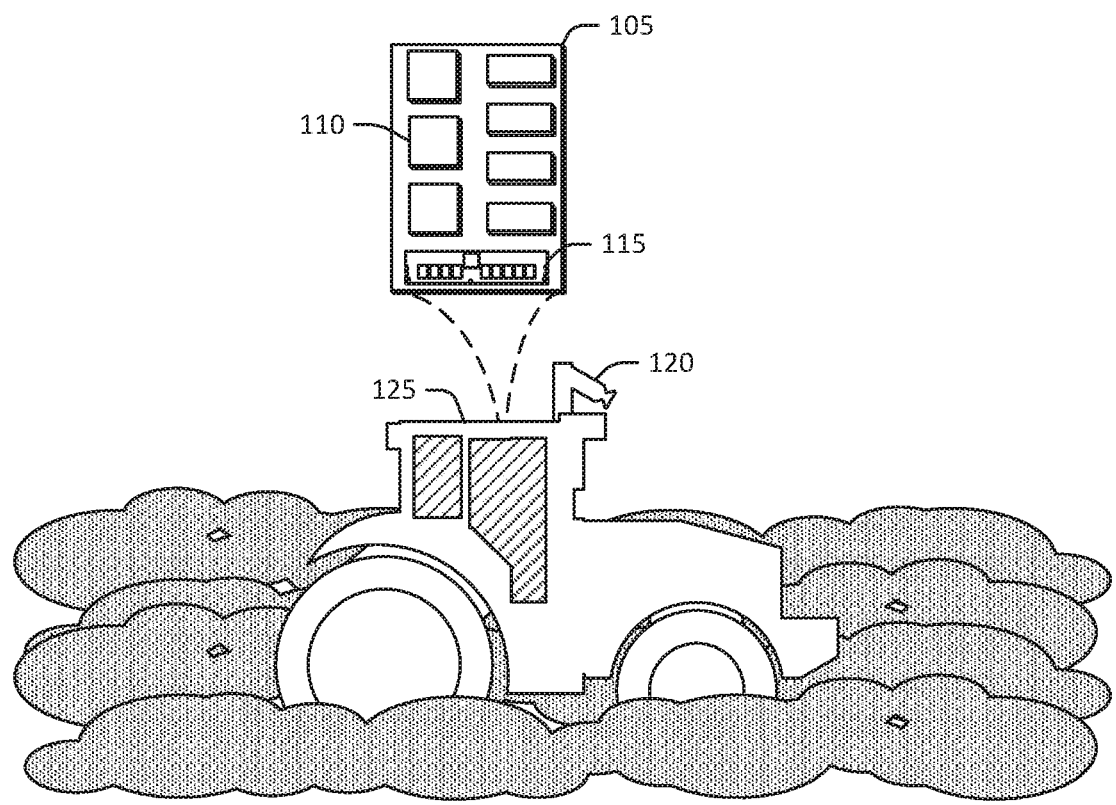
FIG. 1 is an example of an environment including a system for adaptive color transformation to aid CV, according to an embodiment.

Finding crop related rows is an important aspect in determining TKE and XTK in CV systems. An aspect of finding crop related rows in CV (e.g., without the aid of range finders, depth cameras, etc.) is determining which pixels correspond to a crop (e.g., a crop row) and which do not (e.g., a furrow). Generally, color information provides this distinction. However, the shades of green to red to yellow of crops and tan to brown to red of soil can, at times, blend together, making distinctions between crop rows and furrows difficult to detect. Further, processing full color images can involve significant resource expenditures to search for lines in the generally large color space.

To address these issues, an adaptive color transformation is described herein. The color transformation reduces color complexity while adaptively increasing contrast between the probably two main colors respectively corresponding to crop rows and furrows. In an example, the color complexity is reduced to a single value for each pixel, herein called an intensity image or intensity map. When rendered graphically, the intensity image can appear as a grayscale image. Reducing the color complexity can reduce processing and storage used in line detection, resulting in lower latencies (e.g., real-time performance) and reduced equipment and power costs.

To increase the efficacy of the color transformation, the color complexity reduction is performed by increasing contrast between the two dominant colors of the image, here assumed to a first color of the crops and a second color of the soil or other substrate. To accomplish this, a linear relationship between color positions in the multidimensional space is established. One or more lines (e.g., vectors) representing this linear relationship have one or more angles relative to the coordinate system of the multi-dimensional space. These angles are used in the transformation, translating the points to a constant in one dimension, the one being eliminated, via the angle. For example, given an angle α for the line V, and a coordinate of color DP in two dimensions (e.g., represented by (x, y)), then the one-dimensional representation of DP can be z=DP×(cos α, sin α). In an example, the result z can be scaled to fit preferred ranges. This can increase efficiency, for example, by scaling z to fit in fixed size buffers, among other things. Additional details and examples are described below.

Systems that have access to disparity (e.g., depth) information, such as generated by stereo vision cameras or depth cameras, can use disparity information and CV to determine which pixels of an image of crop related rows correspond to a crop or a furrow. In an example a disparity map can be generated such that pixels in the disparity map represent distances, or another equivalent unit such as depth, to camera. The disparity map can serve as a basis for finding or detecting crop related rows, as crops tend to be closer to a camera system installed above the ground and looking down at an angle than furrows. In an example, the disparity map can be used to extend the color space of the image, such as by treating the disparity map as a color dimension, and the adaptive color transformation techniques described herein can be used to reduce the color complexity of the image in the extended color space, such as by projecting the color and disparity information associated of a pixel on to a single pixel value. Accordingly, any reference to the colors, or the distribution of colors, of the image in the discussion that follows, can refer to the color information in the original color space or the color information and the disparity information in the extended color space.

FIG. 1 is an example of an environment including a system 105 for adaptive color transformation to aid CV, according to an embodiment. The environment includes an AEQ 125, such as a tractor, truck, drone, or other vehicle situated proximate to crop related rows. The AEQ 125 includes a sensor 120, such as a camera, and the system 105. The sensor 120 operates by receiving light, which can be in the visible spectrum, ultraviolet, or infrared, or combinations thereof. In an example, the sensor 120 is only a light sensor, and is not a pattern-based or timing-based depth sensor, for example. Accordingly, an output of the sensor 120 is an image where elements (e.g., pixels, regions, etc.) represent wavelengths (e.g., colors) or intensities (e.g., luminance) of light. The sensor 120 can be a stereo vision system having two or more cameras or other sensors for capturing disparity information, such as for pixels in an image generated by the sensor. An output of the sensor 120 can include a disparity map.

Figure 2A:
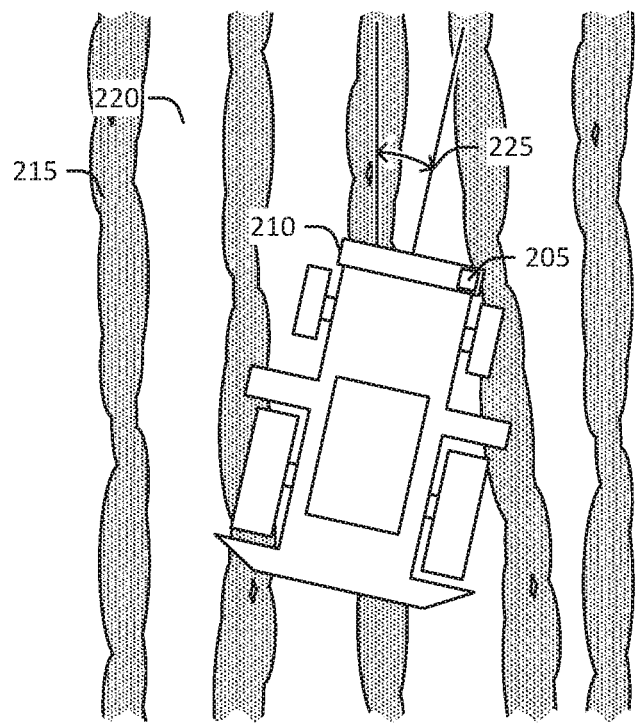
FIGS. 2A-2B illustrate various components and relationships of an AEQ in an operating environment, according to an embodiment.
Figure 2B:
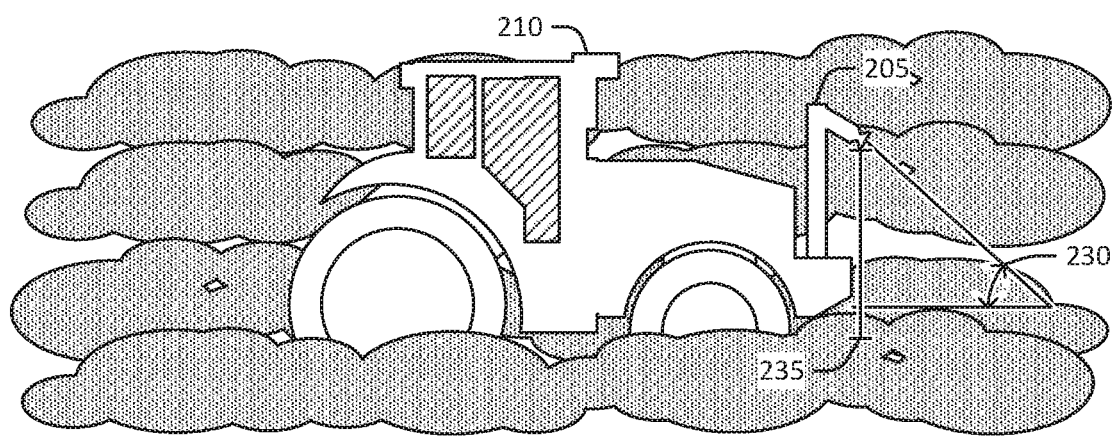

In an example, the sensor 120 is mounted to the AEQ 125 and calibrated for use. Calibration can include such things as providing a mounting height, perspective angle, position on the AEQ 125, etc. The calibration parameters can be used in a homography to translate measurements on the image to the field, for example. These can be used to translate TKE or XTK processed from the image to steering parameters for a steering controller of the AEQ 125. FIGS. 2A and 2B illustrate some additional aspects of the environment.

The system 105 can include processing circuitry 110 and a memory 115 (e.g., computer readable media). The memory 115 is arranged to hold data and instructions for the processing circuitry 110. To support CV navigation, including an adaptive color transformation, for the AEQ 125, the processing circuitry 110 is arranged to obtain a color image (e.g., of a field that includes both crop rows and furrows). In an example the color image includes disparity information, such as a color space dimension (or color channel) representing disparity as an intensity value, such that image features that are closer to the sensor 120 have higher intensity than features that are further away from the sensor. HIere, obtaining the image can include the processing circuitry 110 retrieving the image from a buffer (e.g., in the memory 115) or receiving the image (e.g., directly from the sensor 120 via direct memory access (DMA) or the like). (e.g., retrieved or received).

In an example, the color image is preprocessed from a first color representation that does not include a luminance component of the color to a second color representation that includes a luminance component. The preprocessing can be accomplished by the processing circuitry 110, circuitry in the sensor 120, or other component of the system 105 or the AEQ 125. In an example, the first color representation is red-green-blue (RGB). Generally, in an RGB image, the intensity of each color for each pixel is represented in different channels. In an example, the second color representation is one of YUV, YIQ, YDbDr, YCbCr, YPbPr, ICtCp, or xvYCC. In these color representations, like RGB, three values are used to represent a given color, but the meaning of these values differs. Generally, each has a luma or luminance channel and two chrominance channels (e.g., hue and saturation, blue—luma and red—luma, etc.). Thus, in these examples, if the original image is not represented by a color space containing luminance as one of its explicit components then it is first transformed to a color space that does differentiate between color content (e.g., chrominance) and luminance, like YUV, YPbPr, YCbCr or similar. Several conversion techniques can be used to accomplish this transformation, such as the International Telecommunications Union (ITU) Radiocommunication Sector (ITU-R) standards BT.601, BT.709, BT.2020 among others. The preprocessing can also include associating the transformed color image with a corresponding disparity map, such as by adding the disparity information to an additional color channel of the color image.

After the color image is obtained and possibly preprocessed, the technique involves finding a transformation of the remaining (e.g., two-channel or three-channel) color to a reduced channel (e.g., a single channel) color scale. For example, the transformation will project a two-dimensional or three-dimensional plane onto a one-dimensional line. To accomplish this, a set of reference points is created from the image. The reference points can be all pixels in the image, a region of interest, a uniformly distributed sub-set (e.g., a statistically relevant sample) or any other relevant set of points.

The processing circuitry 110 is arranged to map colors of the image into a multi-dimensional space to create a distribution of colors in the image. Here, a dimension of the multi-dimensional space corresponds to a component of a color (e.g., hue or saturation). The mapped colors are taken from the reference points (e.g., pixels) mentioned above. In an example, where the color representation of the image includes a luminance component (e.g., channel), the luminance component is not mapped to the multi-dimensional space. In an example, the multi-dimensional space is two dimensions (e.g., hue and saturation). Here, luminance is ignored because it generally does not differentiate between crop row pixels and furrow pixels and can even bias the results. Thus, eliminating luminance can enable a quick reduction in color complexity with little negative, and perhaps improved, impact on the result. However, as noted below, if chrominance information alone is insufficient to differentiate between crop pixels and furrow pixels, luminance or disparity can be mapped into a dimension of the multi-dimensional space to produce a better color transformation.

In an example, mapping the colors of the image to a multi-dimensional space includes mapping the color channel that includes the disparity information to the multi-dimensional space. In such example, the multi-dimensional space has three dimensions (e.g., hue, saturation, and disparity). Prior to the mapping, the disparity information can be conditioned, such as by normalizing and bounding the disparity information to color information or ranges of the image.

Once mapped into the multi-dimensional space, the processing circuitry 110 analyzes the distribution of colors to find out if the distribution has a direction (e.g., is it stretched in the coordinate system). If the distribution is stretched, them the processing circuitry 110 ascertains the direction of the stretch and uses this as the basis for a projection from one order to another (e.g., from two-dimensions or three-dimensions to one dimension). If there is no stretch, then the color or disparity differentiation between the crop pixels and furrow pixels is likely too close for reliable row detection.

To determine the direction of the distribution's stretch, the processing circuitry 110 is arranged to fit a line to the distribution. Here, the line includes an angle relative to a coordinate system of the multi-dimensional space that represents the direction of the stretch. This approach enables a good (e.g., maximum) spread of the data points in the lower dimension after the transformation.

Any line fitting technique can be used. In an example, the line fitting is accomplished by applying a linear regression to the distribution. An example is provided below with respect to FIG. 4. In an example, the line fitting is accomplished by clustering points of the distribution and connecting a first centroid of a first cluster to a second centroid of a second cluster to find the line. An example is provided below with respect to FIG. 5. In an example, the line fitting is accomplished by performing an angular scan from a centroid of the distribution. An example is provided below with respect to FIG. 6. In an example, the line fitting is accomplished by applying a theta distribution. Here, the coordinate system of the multi-dimensional space is a polar coordinate system. An example is provided below with respect to FIG. 7.

Another example line fitting techniques can include applying a random consensus sample (RANSAC) line model to the distribution. RANSAC operates similarly to a linear regression with an attempt to reject outliers. Generally, a series of linear models are fit to random samples of the data. The linear model that best fit the data is then selected. This operates on the assumption that inliers have a non-random relationship, and thus will exert an influence across the random samples. In an example, the line fitting is accomplished by applying a standard deviational ellipse to the distribution. The standard deviational ellipse is applied by calculating the standard distance separately in the dimensions (e.g., x and y directions in a two-dimensional space). These two measures define the axes of an ellipse encompassing the distribution of features. The major axis of the standard deviational ellipse can be used at the fit line for the purposes of finding the angle to the coordinate system.

Other example line fitting techniques include the use of principal component analysis (PCA). Generally, the distribution can be organized in a data matrix or a data covariance matrix and normalized, such as by zeroing column means or normalizing column variances. The data matrix or covariance matrix can then be analyzed using singular value decomposition or eigenvalue decomposition, respectively, to determine the principal components of the distribution. For a two-dimensional dataset, a single calculated principle component can be used to find the angle to the coordinate system. For higher dimensional distributions, regression can be run against two or more principal components to determine a best fit line.

Once the angle of the line fit to the distribution is found, the processing circuitry 110 is arranged to transform the colors in the image based on the angle to produce a reduced image. Here, the transformation reduces a color complexity of the image. Generally, the transformation translates the distance between the distribution points of two or three dimensions on to a single dimension, maximize contrast (e.g., separation, distinctiveness, etc.) between the colors. An example of the transformation from a two-dimensional space to a one-dimensional space can be implemented as follows:

Given:
Direction a vector V=(cos α, sin α); and
Data Points DP=(x, y),
then
Scalar (e.g., one-dimensional) point z=DP×V.

Here, a scale factor can be applied to z to fit preferred data ranges for crop related row processing.

As noted above, the effectiveness of the transform can be tied to the directionality, or stretch, of the color distribution in the multi-dimensional space. Thus, ascertaining the quality of the stretch can provide information to the system 105 about the likely effectiveness of trying to determine crop related rows from the reduced image, including taking remedial actions. Thus, in an example, the processing circuitry 110 is arranged to calculate a quality indicator for the transformation. The quality indicator is useful to know if the resulting angle of the fit line is a useful basis for the transformation. The more directional (e.g., stretched or elliptical) the distribution, the better the data spread in the reduced dimensional and the better the quality of the reduced image for row detection. The more circular the distribution (e.g., all directions approaching equality from a centroid of the distribution), the lower the quality of the resulting reduced image.

Generally, the quality indicator computation is based in the technique use to find the distribution direction. For example, when using polar coordinates (r, θ), the standard deviation σ of θ is a good quality indicator. Here, a low σ is more circular (e.g., lower quality) and a higher σ is more directional (e.g., a higher quality. When RANSAC is employed to fit the line to the distribution, lines can be randomly tested under different angles to count the number of data points within a certain distance from the line. Here, the quality indicator is higher when tested angles correspond to the first-found angle have higher counts. Otherwise, if all counts for all angles are roughly equal, then the distribution is more circular, resulting in a lower quality indicator. Thus, in an example, a calculation of the quality indicator is based on a line fitting technique employed when fitting the line to the distribution. In an example, the quality indicator is lower the closer values become of a major axis and a minor axis of an ellipse representing the distribution (e.g., the more circular, rather than elliptical, the distribution is).

In an example, the mapping of colors of the image into the multi-dimensional space is changed in response to the quality indicator being below a threshold. This is an example of a remedial action when the quality indicator is low. In an example, changing the mapping of colors includes using a luminance component of the colors when the luminance component was not already used. As noted above, adding the additional luminance information can, in some circumstances, result in sufficient data to differentiate between crop row and furrow pixels. Other examples of remedial actions can include discarding the image and waiting for a second image, emitting a differentiator, such as a spotlight in white or a particular color (e.g., include infrared or ultraviolet), or slowing the AEQ 125 to wait for a better image.

The adaptive color transformation described herein enables robust crop related row detection considering local disturbances (e.g., the presence of weeds, missing crops, etc.). Its adaptive nature provides crop related row detection across a wide range of crop and substrate colors, enabling the technique to be applied, without modification, to different crops in different environments.

The processing circuitry 110 is arranged to communicate the reduced image to a receiver. Generally, a steering controller of the AEQ 125 is the receiver, however, an intermediary can also be the receiver where the intermediary uses the reduced image to calculate the TKE and XTK values for the steering controller. In an example, the processing circuitry 110 is itself the receiver to also process some or all of the TKE or XTK from the reduced image. Communicating the reduced image can include placing the reduced image in a data structure in the memory 115 or transmitting a representation of the reduced image over an interlink (e.g., bus, network, etc.). In an example, the quality indicator is communicated with the reduced image.

FIGS. 2A-2B illustrate various components and relationships of an AEQ in an operating environment, according to an embodiment. FIG. 2A is a top-down view of an AEQ 210 in a field. The shaded portions represent crop rows 215 and the space between the crop rows 215 are furrows 220. The AEQ 210 includes a sensor 205 mounted to the front side of the AEQ 210. Here, the AEQ 210 is not aligned with the crop rows 215 or furrows 220 but deviates by TKE 225. A steering controller of the AEQ 210 is arranged to steer the AEQ 210 to be in line with the crop rows 215 with wheels in the furrows 220.

FIG. 2B illustrated a side view of the AEQ 210 with the front mounted sensor 205. The height 235 of the sensor 205 and the angle to the ground 230 are calibration parameters for the CV system. These parameters can be provided by a user or can be auto-calibrated. Auto-calibration can take several forms, such as using a rang-finder (e.g., ultrasonic, radar, laser, etc.), or can use the periodic function fitting described herein. In the latter case, given a crop type, for example, different periods can be tested at a given segment to ascertain which period results in a maximum value. The given period is then used as an index to the height 235 or angle 230 calibration parameter.

Figure 3:
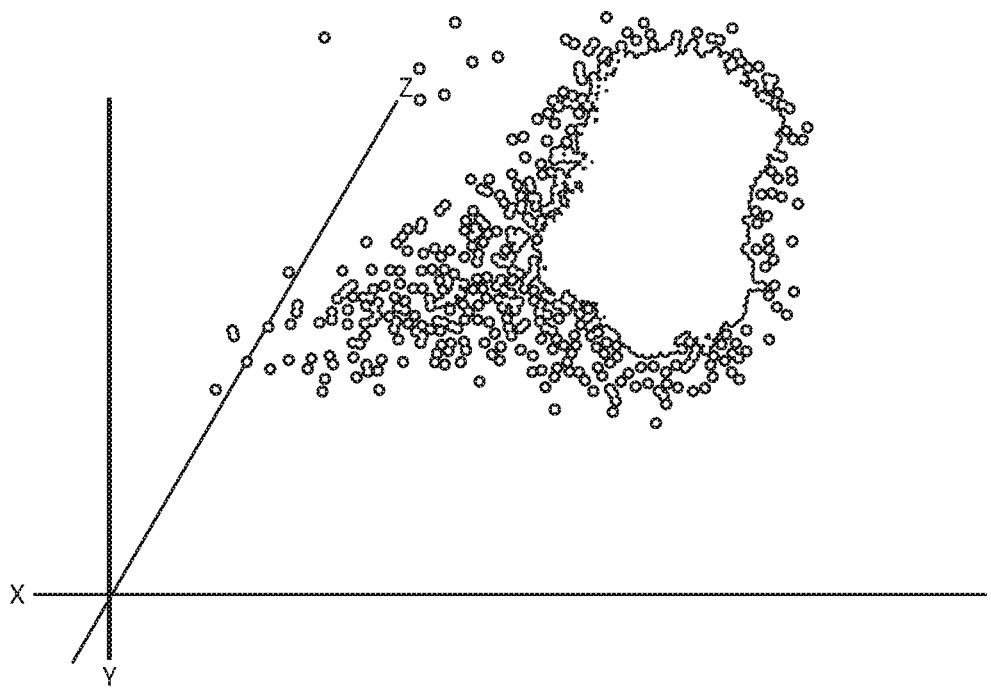
FIG. 3 illustrates mapping colors to a multi-dimensional space, according to an embodiment.

FIG. 3 illustrates mapping colors to a multi-dimensional space, according to an embodiment. As illustrated, the colors are mapped to a three-dimensional coordinate system, such as red, green, and blue, or luminance, hue and saturation. In fact, a greater number of dimensions can be used for images that have greater color depths, such as infrared and ultraviolet, or disparity information. As long as the distribution is not an n-sphere (e.g., a circle when n=2, a sphere when n=3, etc.), then the resulting measurement of the stretch (e.g., line fitting) results in an angle between two of the dimensions that can be used to adaptively reduced the color complexity into a single dimension. In an example, this process can be repeated until the final reduced image is has single dimension color complexity. The following line fitting examples are illustrated in a two-dimensional space, but the techniques are generally applicable in higher order dimensions.

Figure 4:
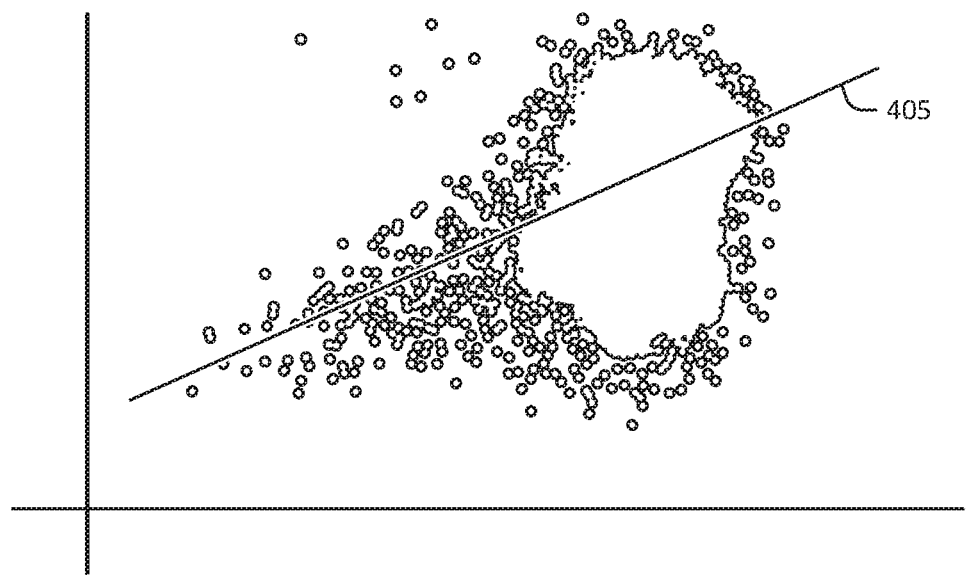
FIG. 4 illustrates fitting a line to a color distribution using linear regression, according to an embodiment.

FIG. 4 illustrates fitting a line to a color distribution using linear regression, according to an embodiment. Here, the line 405 is fit to the distribution using any one of several linear regression techniques. Examples of these techniques can include a least-squares estimation-such as ordinary least squares, generalized least squares, generalized least squares, percentage least squares, etc.—a maximum-likelihood estimation, Bayesian linear regression, among others.

Depending on which linear regression technique is used, outliers can have an undesirable influence on the result. Note that the line 405 has a reduced angle with respect to the illustrated horizontal access than line 515 or 610 respectively illustrated in FIGS. 5 and 6. Techniques, such as RANSAC, can be used to reduce this effect.

Figure 5:
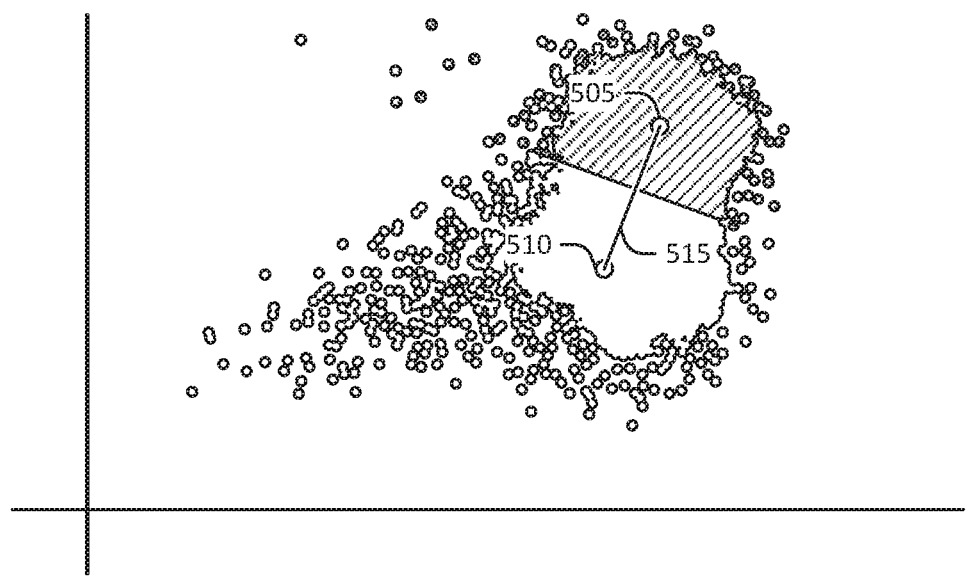
FIG. 5 illustrates fitting a line to a color distribution using clustering, according to an embodiment.

FIG. 5 illustrates fitting a line to a color distribution using clustering, according to an embodiment. Here, the colors are segmented into two clusters (e.g., k-means clustering where k=2). The two clusters are used because of the expectation that two colors will dominate the image, the crop color and the furrow color. Once the colors are clustered, a centroid is computed for each cluster. Thus, the centroid 505 is calculated for the shaded cluster and centroid 510 is calculated for the unshaded cluster. The line 515 is fit by connecting the centroid 505 to the centroid 510.

Figure 6:
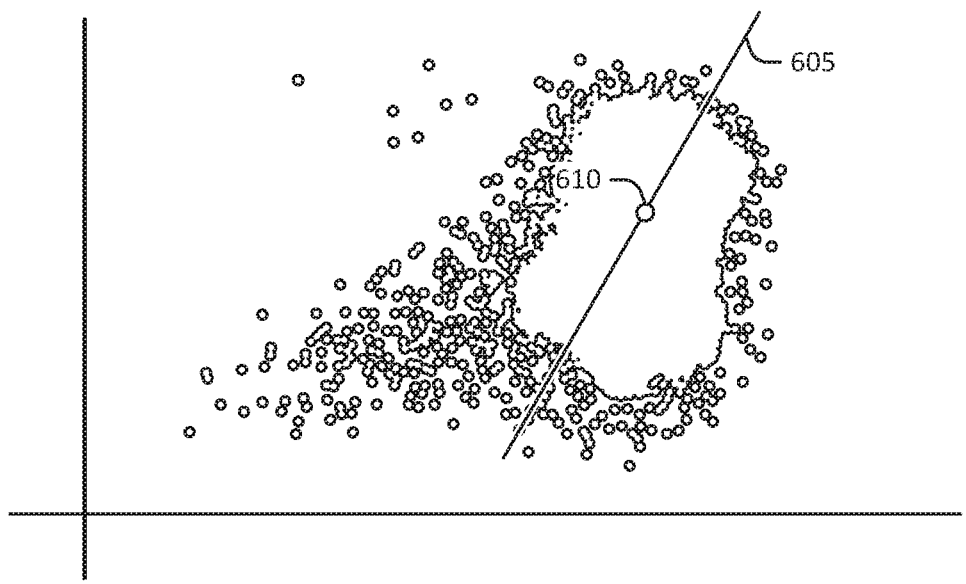
FIG. 6 illustrates fitting a line to a color distribution using an angular scan, according to an embodiment.

FIG. 6 illustrates fitting a line to a color distribution using an angular scan, according to an embodiment. The angular scan operates by counting points on a line at a given angle through a centroid 610 of the distribution. The line with the most points is the fit line 605. For example, the centroid 610 is calculated. The mean distance of the data points in the distribution to the centroid 610 are calculated. This is used to inlier points to test lines in the next operation and can help to exclude outliers. Next, a series of lines that pass through the centroid 610 are tested. Each of these test lines is at a different angle relative to the horizontal axis, for example.

For each test line, count the number of points for which the perpendicular distance to the test line is lower than a pre-defined threshold (e.g., the previously calculated mean of points to the centroid 610). These number of inliers are the score for a given line. Once the tests are complete, the line 605 (e.g., angle) with the highest score is the basis for the transformation.

In this line fitting technique, example quality indicator calculations can include the standard deviation of the different test line scores or a peak-to-peak difference of the test line scores, such as max(score)−min(score).

Figure 7:
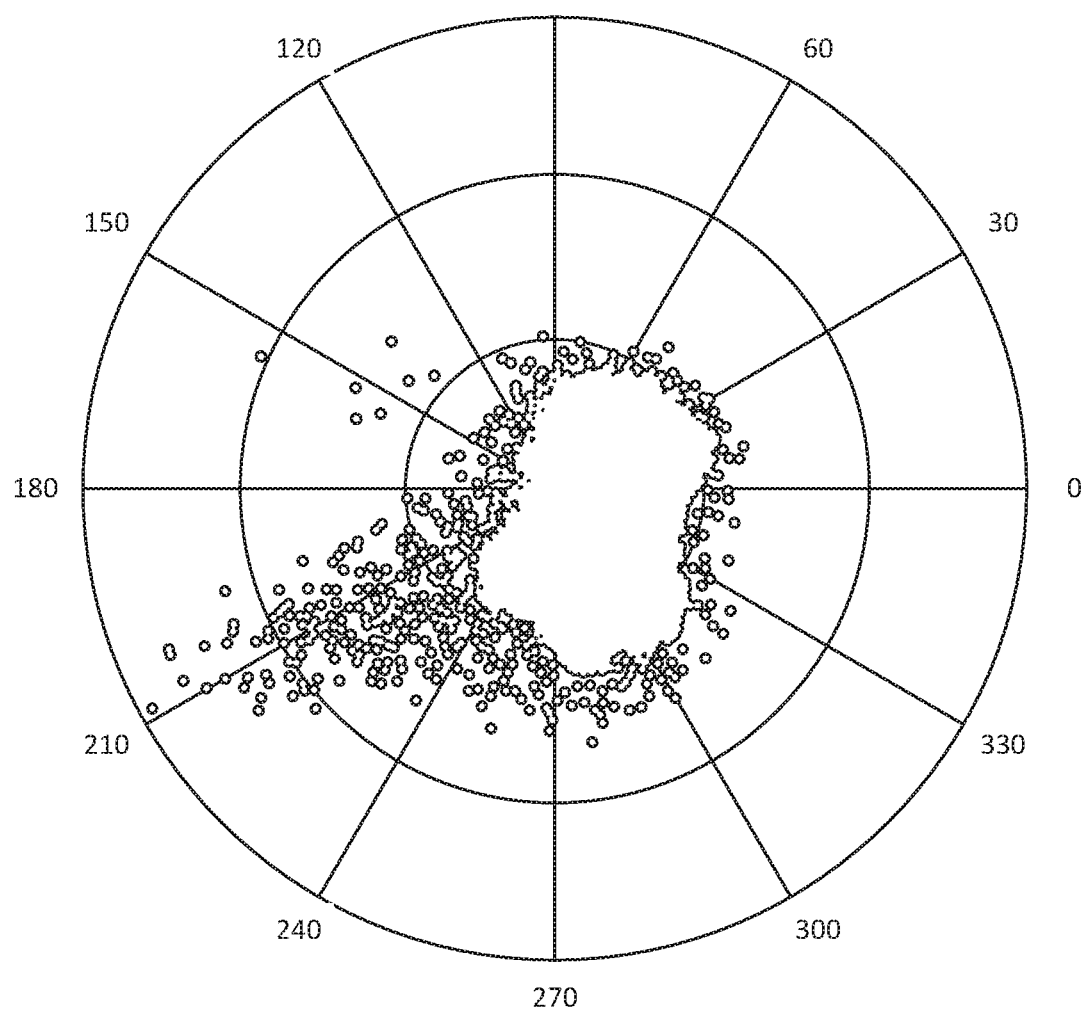
FIG. 7 illustrates fitting a line to a color distribution using a theta distribution, according to an embodiment.

FIG. 7 illustrates fitting a line to a color distribution using a theta distribution, according to an embodiment. Here, the points in the distribution are represented as an angle $\theta$ and a radius r (e.g., (r, $\theta$)) in two dimensions and additional angles in higher dimensions (e.g., (r, $\theta$, $\phi$) in three dimensions). The distribution can be centered in the coordinate system and the angles (e.g., $\theta$ from each point) collected to determine a distribution of the angles. The densest accumulation of angles is the angle desired for the transformation. Thus, the mean of angles, median, or other statistical technique can be used to determine the angle used for the adaptive color transformation.

Figure 8:
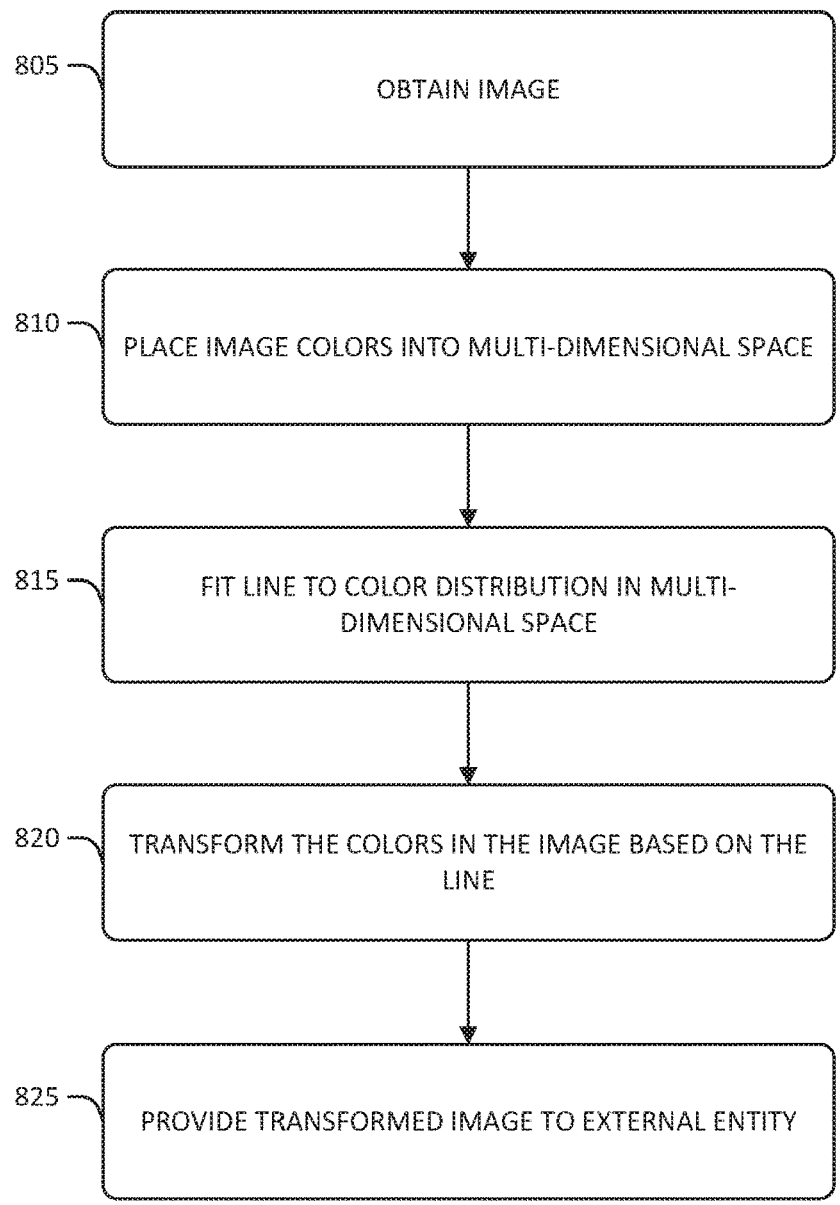
FIG. 8 illustrates a flow diagram of an example of a method for adaptive color transformation to aid CV, according to an embodiment.

FIG. 8 illustrates a flow diagram of an example of a method 800 for adaptive color transformation to aid CV, according to an embodiment. The operations of the method 800 are implemented and performed by hardware, such as that described above or below (e.g., processing circuitry).

At operation 805, a color image is obtained (e.g., received or retrieved). In an example, the color image is preprocessed from a first color representation that does not include a luminance component of the color to a second color representation that includes a luminance component. In an example, the first color representation is red-green-blue (RGB). In an example, the second color representation is one of YUV, YIQ, YDbDr, YCbCr, YPbPr, ICtCp, or xvYCC.

At operation 810, colors of the image are mapped into a multi-dimensional space to create a distribution of colors in the image. Here, a dimension of the multi-dimensional space corresponds to a component of a color. In an example, where the color representation of the image includes a luminance component (e.g., channel), the luminance component is not mapped to the multi-dimensional space. In an example, the multi-dimensional space is two dimensions (e.g., hue and saturation).

At operation 815, a line is fit to the distribution. Here, the line includes an angle relative to a coordinate system of the multi-dimensional space. In an example, the line fitting is accomplished by performing an angular scan from a centroid of the distribution. In an example, the line fitting is accomplished by applying a linear regression to the distribution. In an example, the line fitting is accomplished by applying a theta distribution. Here, the coordinate system of the multi-dimensional space is a polar coordinate system. In an example, the line fitting is accomplished by applying a random consensus sample (RANSAC) line model to the distribution. In an example, the line fitting is accomplished by applying a standard deviational ellipse to the distribution. In an example, the line fitting is accomplished by clustering points of the distribution and connecting a first centroid of a first cluster to a second centroid of a second cluster to find the line.

At operation 820, a transformation is applied to colors in the image based on the angle to produce a reduced image. Here, the transformation reduces a color complexity of the image.

At operation 825, the reduced image is communicated to a receiver.

In an example, the method 800 can be extended to include calculating a quality indicator for the transformation. In an example, the quality indicator is communicated with the reduced image.

In an example, the mapping of colors of the image into the multi-dimensional space is changed in response to the quality indicator being below a threshold. In an example, changing the mapping of colors includes using a luminance component of the colors when the luminance component was not already used.

In an example, a calculation of the quality indicator is based on a line fitting technique employed when fitting the line to the distribution. In an example, the quality indicator is lower the closer values become of a major axis and a minor axis of an ellipse representing the distribution.

Figure 9:
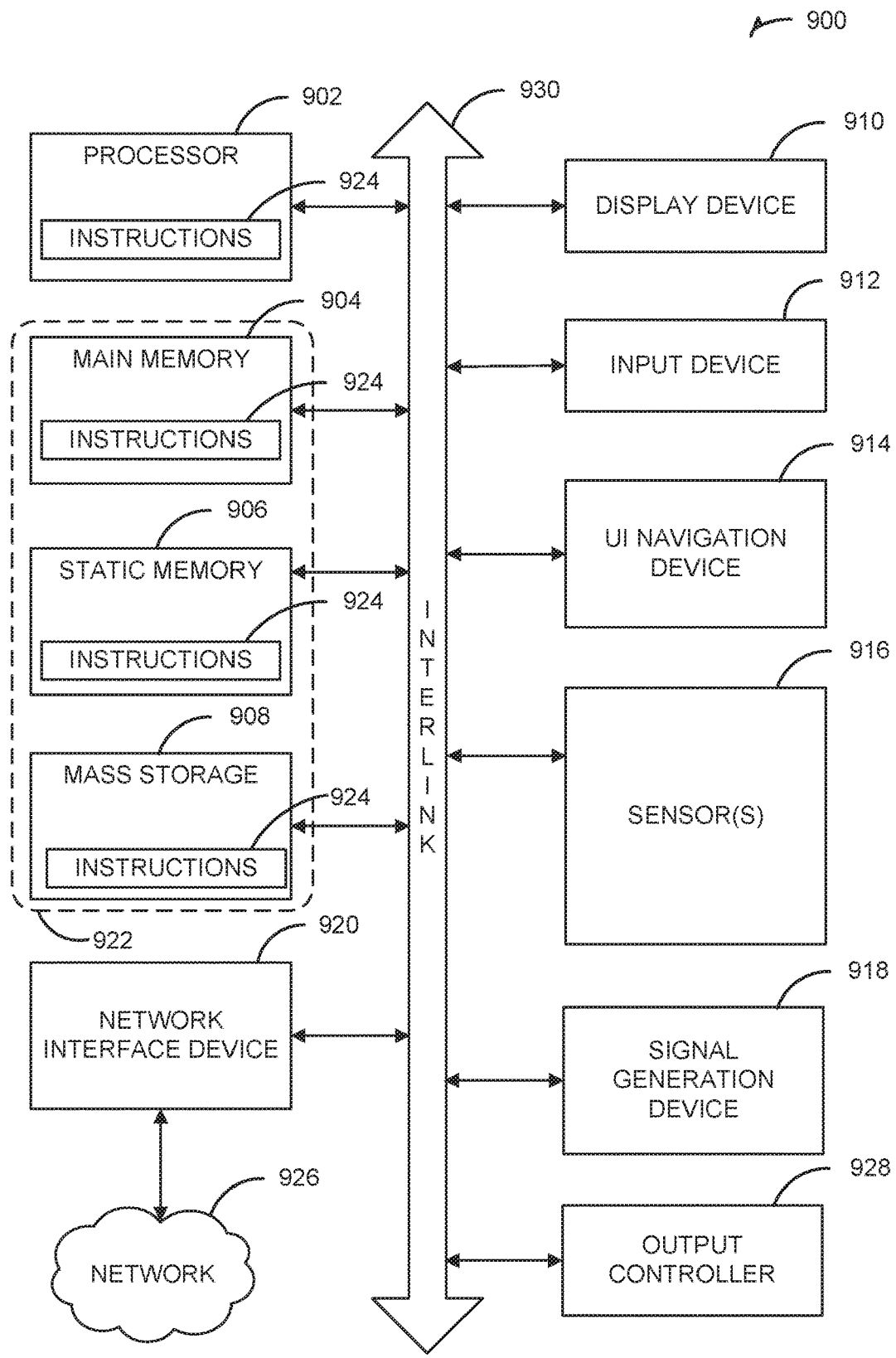
FIG. 9 is a block diagram illustrating an example of a machine upon which one or more embodiments can be implemented.

FIG. 9 illustrates a block diagram of an example machine 900 upon which any one or more of the techniques (e.g., methodologies) discussed herein can perform. Examples, as described herein, can include, or can operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 can include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which can communicate with each other via an interlink (e.g., bus) 930. The machine 900 can further include a display unit 910, an alphanumeric input device 912 (e.g., a keyboard), and a user interface (UI) navigation device 914 (e.g., a mouse). In an example, the display unit 910, input device 912 and UI navigation device 914 can be a touch screen display. The machine 900 can additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 can include an output controller 928, such as a serial (e.g., universal serial bus (USB), parallel, or other wired or wireless (e.g. infrared (IR), near field communication (NFC), etc.) connection to communicate or control one or more peripheral devices (e.g., a printer, card reader, etc.).

Registers of the processor 902, the main memory 904, the static memory 906, or the mass storage 908 can be, or include, a machine readable medium 922 on which is stored one or more sets of data structures or instructions 924 (e.g., software) embodying or utilized by any one or more of the techniques or functions described herein. The instructions 924 can also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 can constitute the machine readable media 922. While the machine readable medium 922 is illustrated as a single medium, the term "machine readable medium" can include a single medium or multiple media (e.g., a centralized or distributed database, and/or associated caches and servers) configured to store the one or more instructions 924.

The term "machine readable medium" can include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 can be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

Additional Notes & Examples

Example 1 is a device for adaptive color transformation to aid computer vision, the device comprising: a memory including instructions; and processing circuitry that is configured by the instructions to: obtain a color image; map colors of the image into a multi-dimensional space to create a distribution of colors in the image, a dimension of the multi-dimensional space corresponding to a component of a color; fit a line to the distribution, the line including an angle relative to a coordinate system of the multi-dimensional space; apply a transformation to colors in the image based on the angle to produce a reduced image, the transformation reducing a color complexity; and communicate the reduced image to a receiver.

In Example 2, the subject matter of Example 1 includes, wherein the color image is preprocessed from a first color representation that does not include a luminance component of the color to a second color representation that includes a luminance component.

In Example 3, the subject matter of Example 2 includes, wherein the first color representation is red-green-blue.

In Example 4, the subject matter of Examples 2-3 includes, wherein the second color representation is one of YUV, YIQ, YDbDr, YCbCr, YPbPr, ICtCp, or xvYCC.

In Example 5, the subject matter of Examples 2-4 includes, wherein the luminance component is not mapped to the multi-dimensional space.

In Example 6, the subject matter of Examples 1-5 includes, wherein the multi-dimensional space is two dimensions.

In Example 7, the subject matter of Examples 1-6 includes, wherein the first color representation or the second color representation includes a depth component.

In Example 8, the subject matter of Examples 1-7 includes, wherein, to fit the line to the distribution, the processing circuitry is arranged by the instructions to apply a linear regression to the distribution to find the line.

In Example 9, the subject matter of Examples 1-8 includes, wherein, to fit the line to the distribution, the processing circuitry is arranged by the instructions to performing an angular scan from a centroid of the distribution to find the line.

In Example 10, the subject matter of Examples 1-9 includes, wherein, to fit the line to the distribution includes, the processing circuitry is arranged by the instructions to apply a theta distribution, wherein a coordinate system of the multi-dimensional space is a polar coordinate system.

In Example 11, the subject matter of Examples 1-10 includes, wherein, to fit the line to the distribution, the processing circuitry is arranged by the instructions to apply a random consensus sample (RANSAC) line model to the distribution.

In Example 12, the subject matter of Examples 1-11 includes, wherein, to fit the line to the distribution, the processing circuitry is arranged by the instructions to apply a standard deviational ellipse to the distribution.

In Example 13, the subject matter of Examples 1-12 includes, wherein, to fit the line to the distribution, the processing circuitry is arranged by the instructions to: cluster points of the distribution; and connect a first centroid of a first cluster to a second centroid of a second cluster to find the line.

In Example 14, the subject matter of Examples 1-13 includes, wherein the instructions cause the processing circuitry to calculate a quality indicator for the transformation.

In Example 15, the subject matter of Example 14 includes, wherein, to communicate the reduced image, the processing circuitry is arranged by the instructions to communicate the quality indicator.

In Example 16, the subject matter of Examples 14-15 includes, wherein the processing circuitry is arranged by the instructions to change the mapping of colors of the image into the multi-dimensional space in response to the quality indicator being below a threshold.

In Example 17, the subject matter of Example 16 includes, wherein, to change the mapping of colors, the processing circuitry is arranged by the instructions to use a luminance component of the colors when the luminance component was not already used.

In Example 18, the subject matter of Examples 14-17 includes, wherein a calculation of the quality indicator is based on a line fitting technique employed when fitting the line to the distribution.

In Example 19, the subject matter of Example 18 includes, wherein the quality indicator is lower the closer values become of a major axis and a minor axis of an ellipse representing the distribution.

In Example 20, the subject matter of Examples 18-19 includes, wherein the quality indicator is lower the closer values become of a major axis and a minor axis of an ellipse representing the distribution.

Example 21 is a method for adaptive color transformation to aid computer vision, the method comprising: obtaining a color image; mapping colors of the image into a multi-dimensional space to create a distribution of colors in the image, a dimension of the multi-dimensional space corresponding to a component of a color; fitting a line to the distribution, the line including an angle relative to a coordinate system of the multi-dimensional space; applying a transformation to colors in the image based on the angle to produce a reduced image, the transformation reducing a color complexity; and communicating the reduced image to a receiver.

In Example 22, the subject matter of Example 21 includes, wherein the color image is preprocessed from a first color representation that does not include a luminance component of the color to a second color representation that includes a luminance component.

In Example 23, the subject matter of Example 22 includes, wherein the first color representation is red-green-blue.

In Example 24, the subject matter of Examples 22-23 includes, wherein the second color representation is one of YUV, YIQ, YDbDr, YCbCr, YPbPr, ICtCp, or xvYCC.

In Example 25, the subject matter of Examples 22-24 includes, wherein the luminance component is not mapped to the multi-dimensional space.

In Example 26, the subject matter of Examples 21-25 includes, wherein the multi-dimensional space is two dimensions.

In Example 27, the subject matter of Examples 21-26 includes, wherein fitting the line to the distribution includes applying a linear regression to the distribution to find the line.

In Example 28, the subject matter of Examples 21-27 includes, wherein fitting the line to the distribution includes performing an angular scan from a centroid of the distribution to find the line.

In Example 29, the subject matter of Examples 21-28 includes, wherein fitting the line to the distribution includes applying a theta distribution, wherein a coordinate system of the multi-dimensional space is a polar coordinate system.

In Example 30, the subject matter of Examples 21-29 includes, wherein fitting the line to the distribution includes applying a random consensus sample (RANSAC) line model to the distribution.

In Example 31, the subject matter of Examples 21-30 includes, wherein fitting the line to the distribution includes applying a standard deviational ellipse to the distribution.

In Example 32, the subject matter of Examples 21-31 includes, wherein fitting the line to the distribution includes: clustering points of the distribution; and connecting a first centroid of a first cluster to a second centroid of a second cluster to find the line.

In Example 33, the subject matter of Examples 21-32 includes, calculating a quality indicator for the transformation.

In Example 34, the subject matter of Example 33 includes, wherein communicating the reduced image includes communicating the quality indicator.

In Example 35, the subject matter of Examples 33-34 includes, changing the mapping of colors of the image into the multi-dimensional space in response to the quality indicator being below a threshold.

In Example 36, the subject matter of Example 35 includes, wherein changing the mapping of colors includes using a luminance component of the colors when the luminance component was not already used.

In Example 37, the subject matter of Examples 33-36 includes, wherein a calculation of the quality indicator is based on a line fitting technique employed when fitting the line to the distribution.

In Example 38, the subject matter of Example 37 includes, wherein the quality indicator is lower the closer values become of a major axis and a minor axis of an ellipse representing the distribution.

Example 39 is a machine readable medium including instructions for adaptive color transformation to aid computer vision, the instructions, when executed by processing circuitry, cause the processing circuitry to perform operations comprising: obtaining a color image; mapping colors of the image into a multi-dimensional space to create a distribution of colors in the image, a dimension of the multi-dimensional space corresponding to a component of a color; fitting a line to the distribution, the line including an angle relative to a coordinate system of the multi-dimensional space; applying a transformation to colors in the image based on the angle to produce a reduced image, the transformation reducing a color complexity; and communicating the reduced image to a receiver.

In Example 40, the subject matter of Example 39 includes, wherein the color image is preprocessed from a first color representation that does not include a luminance component of the color to a second color representation that includes a luminance component.

In Example 41, the subject matter of Example 40 includes, wherein the first color representation is red-green-blue.

In Example 42, the subject matter of Examples 40-41 includes, wherein the second color representation is one of YUV, YIQ, YDbDr, YCbCr, YPbPr, ICtCp, or xvYCC.

In Example 43, the subject matter of Examples 40-42 includes, wherein the luminance component is not mapped to the multi-dimensional space.

In Example 44, the subject matter of Examples 39-43 includes, wherein the multi-dimensional space is two dimensions.

In Example 45, the subject matter of Examples 39-44 includes, wherein fitting the line to the distribution includes applying a linear regression to the distribution to find the line.

In Example 46, the subject matter of Examples 39-45 includes, wherein fitting the line to the distribution includes performing an angular scan from a centroid of the distribution to find the line.

In Example 47, the subject matter of Examples 39-46 includes, wherein fitting the line to the distribution includes applying a theta distribution, wherein a coordinate system of the multi-dimensional space is a polar coordinate system.

In Example 48, the subject matter of Examples 39-47 includes, wherein fitting the line to the distribution includes applying a random consensus sample (RANSAC) line model to the distribution.

In Example 49, the subject matter of Examples 39-48 includes, wherein fitting the line to the distribution includes applying a standard deviational ellipse to the distribution.

In Example 50, the subject matter of Examples 39-49 includes, wherein fitting the line to the distribution includes: clustering points of the distribution; and connecting a first centroid of a first cluster to a second centroid of a second cluster to find the line.

In Example 51, the subject matter of Examples 39-50 includes, wherein the operations comprise calculating a quality indicator for the transformation.

In Example 52, the subject matter of Example 51 includes, wherein communicating the reduced image includes communicating the quality indicator.

In Example 53, the subject matter of Examples 51-52 includes, wherein the operations comprise changing the mapping of colors of the image into the multi-dimensional space in response to the quality indicator being below a threshold.

In Example 54, the subject matter of Example 53 includes, wherein changing the mapping of colors includes using a luminance component of the colors when the luminance component was not already used.

In Example 55, the subject matter of Examples 51-54 includes, wherein a calculation of the quality indicator is based on a line fitting technique employed when fitting the line to the distribution.

In Example 56, the subject matter of Example 55 includes, wherein the quality indicator is lower the closer values become of a major axis and a minor axis of an ellipse representing the distribution.

Example 57 is a system for adaptive color transformation to aid computer vision, the system comprising: means for obtaining a color image; means for mapping colors of the image into a multi-dimensional space to create a distribution of colors in the image, a dimension of the multi-dimensional space corresponding to a component of a color; means for fitting a line to the distribution, the line including an angle relative to a coordinate system of the multi-dimensional space; means for applying a transformation to colors in the image based on the angle to produce a reduced image, the transformation reducing a color complexity; and means for communicating the reduced image to a receiver.

In Example 58, the subject matter of Example 57 includes, wherein the color image is preprocessed from a first color representation that does not include a luminance component of the color to a second color representation that includes a luminance component.

In Example 59, the subject matter of Example 58 includes, wherein the first color representation is red-green-blue.

In Example 60, the subject matter of Examples 58-59 includes, wherein the second color representation is one of YUV, YIQ, YDbDr, YCbCr, YPbPr, ICtCp, or xvYCC.

In Example 61, the subject matter of Examples 58-60 includes, wherein the luminance component is not mapped to the multi-dimensional space.

In Example 62, the subject matter of Examples 57-61 includes, wherein the multi-dimensional space is two dimensions.

In Example 63, the subject matter of Examples 57-62 includes, wherein the means for fitting the line to the distribution include means for applying a linear regression to the distribution to find the line.

In Example 64, the subject matter of Examples 57-63 includes, wherein the means for fitting the line to the distribution include means for performing an angular scan from a centroid of the distribution to find the line.

In Example 65, the subject matter of Examples 57-64 includes, wherein the means for fitting the line to the distribution include means for applying a theta distribution, wherein a coordinate system of the multi-dimensional space is a polar coordinate system.

In Example 66, the subject matter of Examples 57-65 includes, wherein the means for fitting the line to the distribution include means for applying a random consensus sample (RANSAC) line model to the distribution.

In Example 67, the subject matter of Examples 57-66 includes, wherein the means for fitting the line to the distribution include means for applying a standard deviational ellipse to the distribution.

In Example 68, the subject matter of Examples 57-67 includes, wherein the means for fitting the line to the distribution include: means for clustering points of the distribution; and means for connecting a first centroid of a first cluster to a second centroid of a second cluster to find the line.

In Example 69, the subject matter of Examples 57-68 includes, means for calculating a quality indicator for the transformation.

In Example 70, the subject matter of Example 69 includes, wherein the means for communicating the reduced image include means for communicating the quality indicator.

In Example 71, the subject matter of Examples 69-70 includes, means for changing the mapping of colors of the image into the multi-dimensional space in response to the quality indicator being below a threshold.

In Example 72, the subject matter of Example 71 includes, wherein the means for changing the mapping of colors include means for using a luminance component of the colors when the luminance component was not already used.

In Example 73, the subject matter of Examples 69-72 includes, wherein a calculation of the quality indicator is based on a line fitting technique employed when fitting the line to the distribution.

In Example 74, the subject matter of Example 73 includes, wherein the quality indicator is lower the closer values become of a major axis and a minor axis of an ellipse representing the distribution.

Example 75 is at least one machine-readable medium including instructions that, when executed by processing circuitry, cause the processing circuitry to perform operations to implement of any of Examples 1-74.

Example 76 is an apparatus comprising means to implement of any of Examples 1-74.

Example 77 is a system to implement of any of Examples 1-74.

Example 78 is a method to implement of any of Examples 1-74.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for adaptive color transformation to aid computer vision, the device comprising:

a memory including instructions; and processing circuitry that is configured by the instructions to:

obtain a color image;

map pixels colors of the color image to a space having a first dimension that corresponds to a first constituent component of the pixel colors and a second dimension that corresponds to a second constituent component of the pixel colors, a position of a pixel in the color space being determined by a values of the first and second constituent components of a color of the pixel;

determine a linear relationship between positions of the pixel colors by fitting a line to a distribution of the pixel colors in color space;

determine, based on the linear relationship, an angle between the line and the first or second dimension of the color space, the angle indicative of a directionality of the distribution of pixels colors in the color space;

transform the image into a reduced image by using the angle to combine the first component and the second component into an intensity dimension in the reduced image, wherein combining the first component and the second component in the reduced image increases a distance between the at least two colors in the intensity dimension of the reduced image; and communicate the reduced image to a receiver.

2. The device of claim 1, wherein the color image is preprocessed from a first color representation that does not include a luminance component of the pixel colors to a second color representation that includes a luminance component.

3. The device of claim 2, wherein the first color representation is red-green-blue.

4. The device of claim 2, wherein the second color representation is one of YUV, YIQ, YDbDr, YCbCr, YPbPr, ICtCp, or xvYCC.

5. The device of claim 2, wherein the first color representation or the second color representation includes a depth component.

6. The device of claim 1, wherein, to fit the line to the distribution, the processing circuitry is arranged by the instructions to apply a linear regression to the distribution to find the line.

7. The device of claim 1, wherein, to fit the line to the distribution, the processing circuitry is arranged by the instructions to performing an angular scan from a centroid of the distribution to find the line.

8. The device of claim 1, wherein, to fit the line to the distribution includes, the processing circuitry is arranged by the instructions to apply a theta distribution, wherein a coordinate system of the multi dimensional color space is a polar coordinate system.

9. The device of claim 1, wherein, to fit the line to the distribution, the processing circuitry is arranged by the instructions to apply a random consensus sample (RANSAC) line model to the distribution.

10. The device of claim 1, wherein, to fit the line to the distribution, the processing circuitry is arranged by the instructions to apply a standard deviational ellipse to the distribution.

11. The device of claim 1, wherein, to fit the line to the distribution, the processing circuitry is arranged by the instructions to:
- cluster points of the distribution; and
- connect a first centroid of a first cluster to a second centroid of a second cluster to find the line.

12. The device of claim 1, wherein the instructions cause the processing circuitry to calculate a quality indicator for the transformation.

13. The device of claim 12, wherein the processing circuitry is arranged by the instructions to change the mapping of the pixel colors of the image into the color space in response to the quality indicator being below a threshold.

14. The device of claim 13, wherein, to change the mapping of the pixel colors, the processing circuitry is arranged by the instructions to use a luminance component of the colors when the luminance component was not already used.

15. The device of claim 12, wherein a calculation of the quality indicator is based on a line fitting technique employed when fitting the line to the distribution.

16. The device of claim 15, wherein the quality indicator is lower the closer values become of a major axis and a minor axis of an ellipse representing the distribution.

17. A method for adaptive color transformation to aid computer vision, the method comprising:
- obtaining a color image;
- mapping pixels colors of the color image to a color space having a first dimension that corresponds to a first constituent component of the pixel colors and a second dimension that corresponds to a second constituent component of the pixel colors, a position of a pixel in the color space being determined by a values of the first and second constituent components of a color of the pixel;
- determining a linear relationship between positions of the pixel colors by fitting a line to a distribution of the pixel colors in the color space;
- determining, based on the linear relationship, an angle between the line and the first or second dimension of the color space, the angle indicative of a directionality of the distribution of pixels colors in the color space;
- transforming the image into a reduced image by using the angle to combine the first component and the second component into an intensity dimension in the reduced image, wherein combining the first component and the second component in the reduced image increases a distance between the at least two colors in the intensity dimension of the reduced image; and
- communicating the reduced image to a receiver.

18. The method of claim 17, wherein the color image is preprocessed from a first color representation that does not include a luminance component of the pixel colors to a second color representation that includes a luminance component.

19. The method of claim 18, wherein the first color representation or the second color representation includes a depth component.

20. The method of claim 17, wherein fitting the line to the distribution includes applying a linear regression to the distribution to find the line.

* * * * *